United States Patent
Durrant et al.

(10) Patent No.: US 7,458,517 B2
(45) Date of Patent: Dec. 2, 2008

(54) RADIO FREQUENCY IDENTIFICATION OF A CONNECTOR BY A PATCH PANEL OR OTHER SIMILAR STRUCTURE

(75) Inventors: Richard C. E. Durrant, Suffolk (GB); Maurice Fitzgibbon, Glen Cove, NY (US)

(73) Assignee: Stratos International, Inc., Chicago, IL (US)

( * ) Notice: Subject to any disclaimer, the term of this patent is extended or adjusted under 35 U.S.C. 154(b) by 0 days.

(21) Appl. No.: 11/078,532

(22) Filed: Mar. 13, 2005

(65) Prior Publication Data
US 2005/0231325 A1    Oct. 20, 2005

Related U.S. Application Data

(63) Continuation of application No. 10/816,749, filed on Apr. 2, 2004.

(51) Int. Cl.
*G08B 13/14* (2006.01)
*G06K 19/06* (2006.01)

(52) U.S. Cl. .................. 235/492; 340/572.1; 340/687

(58) Field of Classification Search ............... 235/492; 340/572.1–572.9, 687
See application file for complete search history.

(56) References Cited

U.S. PATENT DOCUMENTS

| | | | | |
|---|---|---|---|---|
| 5,066,091 A * | 11/1991 | Stoy et al. | .......... | 385/98 |
| 5,161,988 A | 11/1992 | Krupka | .......... | 439/136 |
| 5,206,626 A | 4/1993 | Minasy et al. | .......... | 340/572 |
| 5,233,674 A | 8/1993 | Vladic | .......... | 385/56 |
| 5,448,110 A | 9/1995 | Tuttle et al. | .......... | 257/723 |
| 5,473,715 A | 12/1995 | Schofield et al. | .......... | 385/53 |
| 5,481,634 A | 1/1996 | Anderson et al. | .......... | 385/76 |
| 5,483,467 A | 1/1996 | Krupka et al. | | |
| 5,821,510 A | 10/1998 | Cohen et al. | | |
| 5,854,824 A | 12/1998 | Bengal et al. | .......... | 379/34 |
| 5,910,776 A | 6/1999 | Black | .......... | 340/825.35 |

(Continued)

FOREIGN PATENT DOCUMENTS

DE    198 41 738 A1    3/2000

(Continued)

OTHER PUBLICATIONS

Supplementary European Search Report, for PCT Appl. No. PCT/US2005011031, dated May 20, 2008, 3 pages, European Patent Office.

*Primary Examiner*—Daniel A Hess
(74) *Attorney, Agent, or Firm*—Karl D. Kovach (57) ABSTRACT

The device includes a fiber optic cable, a transponder, a panel, an antenna, and a transceiver. The transponder is attached to a fiber optic connector of the fiber optic cable. The antenna is positioned adjacent to the panel. The transceiver is electrically connected to the antenna, the transceiver is able to activate the transponder thus enabling the transceiver to read the information deposited with the transponder. Information deposited with the transponder can include information related to the length of the fiber optic cable, information related to the industrial standard to which the fiber optic connector conforms, information related to the predetermined optical fiber grade of the optical fiber of the fiber optic cable, information related to the specific purchase date of the fiber optic cable, or information related to the warranty of the fiber optic cable.

5 Claims, 9 Drawing Sheets

U.S. PATENT DOCUMENTS

| | | | |
|---|---|---|---|
| 6,002,331 A | 12/1999 | Laor | 340/539 |
| 6,118,379 A | 9/2000 | Kodukula et al. | 340/572.8 |
| 6,147,655 A | 11/2000 | Roesner | 343/741 |
| 6,222,452 B1 * | 4/2001 | Ahlstrom et al. | 340/572.1 |
| 6,238,235 B1 | 5/2001 | Shavit et al. | 439/418 |
| 6,350,063 B1 | 2/2002 | Gilliland et al. | 385/88 |
| 6,424,263 B1 | 7/2002 | Lee et al. | 340/572.7 |
| 6,424,710 B1 | 7/2002 | Bartolutti et al. | |
| 6,429,831 B2 | 8/2002 | Babb | 343/895 |
| 6,445,297 B1 | 9/2002 | Nicholson | 340/572.7 |
| 6,451,154 B1 * | 9/2002 | Grabau et al. | 156/300 |
| 6,574,586 B1 | 6/2003 | David et al. | 702/183 |
| 6,677,917 B2 | 1/2004 | Van Heerden et al. | 343/897 |
| 6,684,179 B1 | 1/2004 | David | 702/183 |
| 6,725,177 B2 | 4/2004 | David et al. | 702/183 |
| 6,742,936 B1 * | 6/2004 | Knecht et al. | 385/67 |
| 6,744,939 B2 * | 6/2004 | Lampert et al. | 385/11 |
| 6,745,971 B1 * | 6/2004 | Renzoni | 242/388.1 |
| 6,746,160 B2 * | 6/2004 | Takeuti et al. | 385/84 |
| 6,751,699 B1 * | 6/2004 | Langley, Sr. et al. | 710/317 |
| 6,755,577 B2 * | 6/2004 | Inujima et al. | 385/88 |
| 6,784,802 B1 | 8/2004 | Stanescu | 340/687 |
| 6,808,116 B1 | 10/2004 | Eslambolchi et al. | |
| 6,818,920 B2 * | 11/2004 | De Leeuw et al. | 257/48 |
| 6,847,856 B1 * | 1/2005 | Bohannon | 700/115 |
| 6,908,233 B2 | 6/2005 | Nakajima et al. | |
| 7,000,834 B2 | 2/2006 | Hind et al. | |
| 7,210,855 B2 | 5/2007 | Rossi et al. | |
| 7,221,258 B2 | 5/2007 | Lane et al. | |
| 7,239,226 B2 | 7/2007 | Berardi et al. | |
| 2004/0008114 A1 | 1/2004 | Sawyer | 340/572 |
| 2004/0008120 A1 | 1/2004 | Duncan et al. | 340/685 |
| 2004/0008123 A1 | 1/2004 | Carrender et al. | 340/825.49 |
| 2004/0010449 A1 | 1/2004 | Berardi et al. | 705/16 |
| 2004/0184747 A1 * | 9/2004 | Koyasu et al. | 385/101 |

FOREIGN PATENT DOCUMENTS

| | | |
|---|---|---|
| EP | 1 410 766 | 4/2004 |
| WO | WO 2004/030154 A2 | 4/2004 |
| WO | WO 2004/044599 A2 | 5/2004 |

\* cited by examiner

RADIO FREQUENCY IDENTIFICATION OF A CONNECTOR BY A PATCH PANEL OR OTHER SIMILAR STRUCTURE

This is a continuation of U.S. patent application Ser. No. 10/816,749, filed Apr. 2, 2004, which is hereby incorporated herein by reference.

BACKGROUND OF THE INVENTION

1. Field of the Invention

The present invention pertains to radio frequency identification devices. The invention more particularly concerns the radio frequency identification of a connector by a patch panel.

2. Discussion of the Background

Radio frequency identification devices (RFID) are known in the art. Typically, radio frequency identification systems incorporate an antenna or coil, a transceiver (with decoder), and a transponder (RF tag). Often times the antenna and the transceiver are packaged together so as to form a reader or interrogator. The transponder includes a transponder antenna and an integrated circuit chip attached to the transponder antenna. The antenna or coil emits a radio wave which induces an electrical current in the antenna of the transponder. The electrical current then activates the integrated circuit chip of the transponder. The integrated circuit chip can then transmit information through the antenna of the transponder via radio waves back to the antenna or coil. Information can be stored on the integrated circuit as either read only memory or read/write memory.

Radio frequency identification devices can be either active or passive. An active system includes a transponder which contains its own power source. In contrast, in a passive system the transponder obtains the energy from the radio waves emanating from the antenna or coil so as to enable the transponder to operate and transmit information. A transponder operating in accordance with the active system is able to transmit information to the antenna or coil over a greater distance than is a transponder operating in accordance with the passive system. However, the transponder operating in accordance with the active system is larger than the transponder operating in accordance with the passive system. Furthermore, typically transponders operating in accordance with the passive system contain integrated circuit chips that have read only memory. Examples of radio frequency identification components are presented in U.S. Pat. Nos. 5,206,626; 5,448,110; 6,118,379; 6,147,655; 6,424,263; 6,429,831; 6,445,297; 6,451,154; and 6,677,917. U.S. Pat. Nos. 5,206,626; 5,448,110; 6,118,379; 6,147,655; 6,424,263; 6,429,831; 6,445,297; 6,451,154; and 6,677,917 are hereby incorporated herein by reference.

Figure 1:
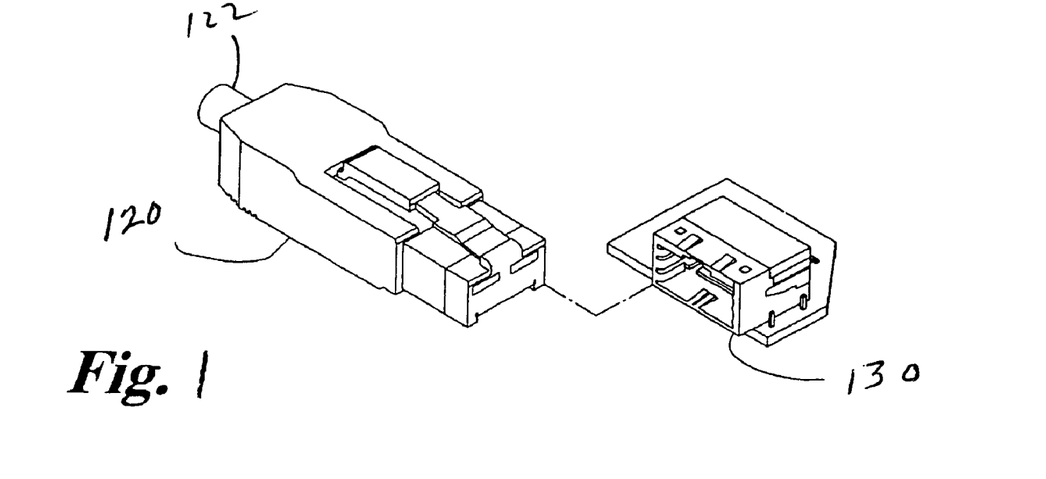
FIG. 1 is a perspective view of a copper based electrical connector and a complementary receptacle, the electrical connector is attached to a copper based electrical cable.
Figure 2:
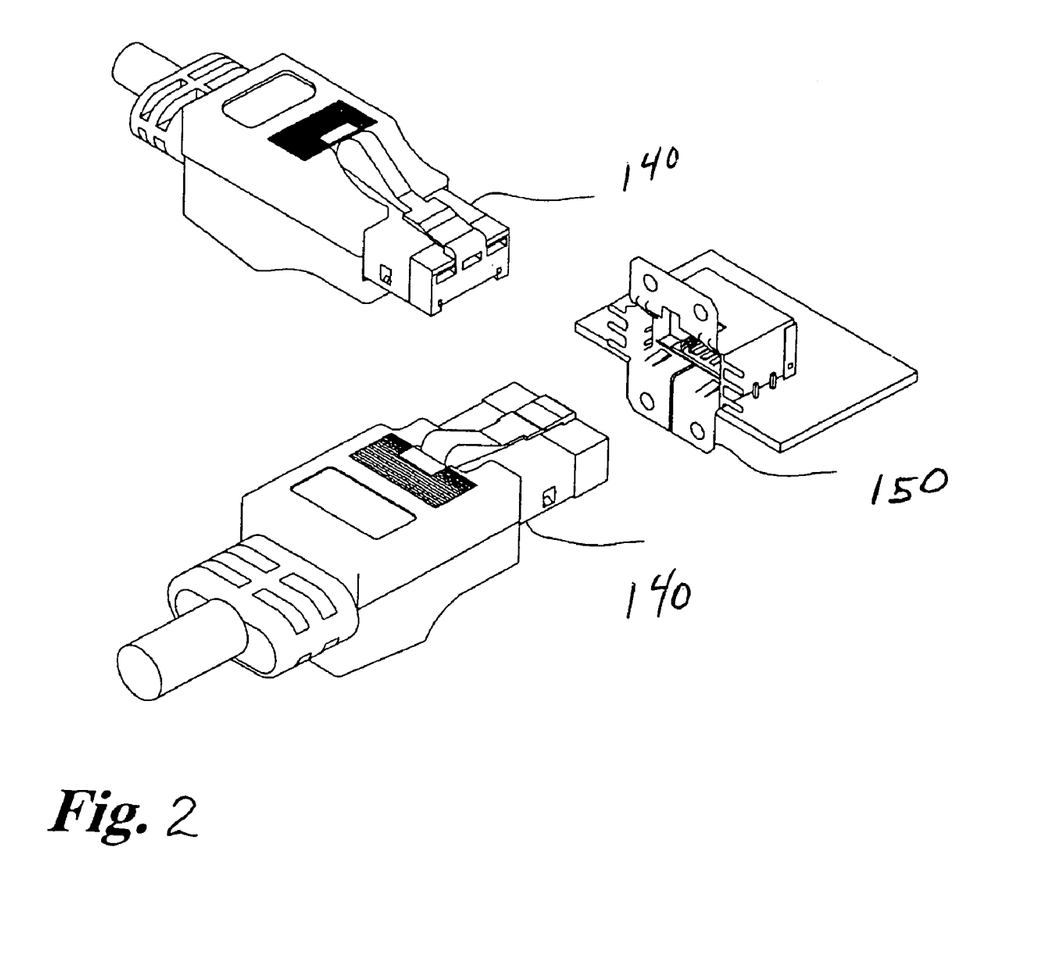
FIG. 2 is a perspective view of another version of the electrical connector and complementary receptacle of FIG. 1.
Figure 3:
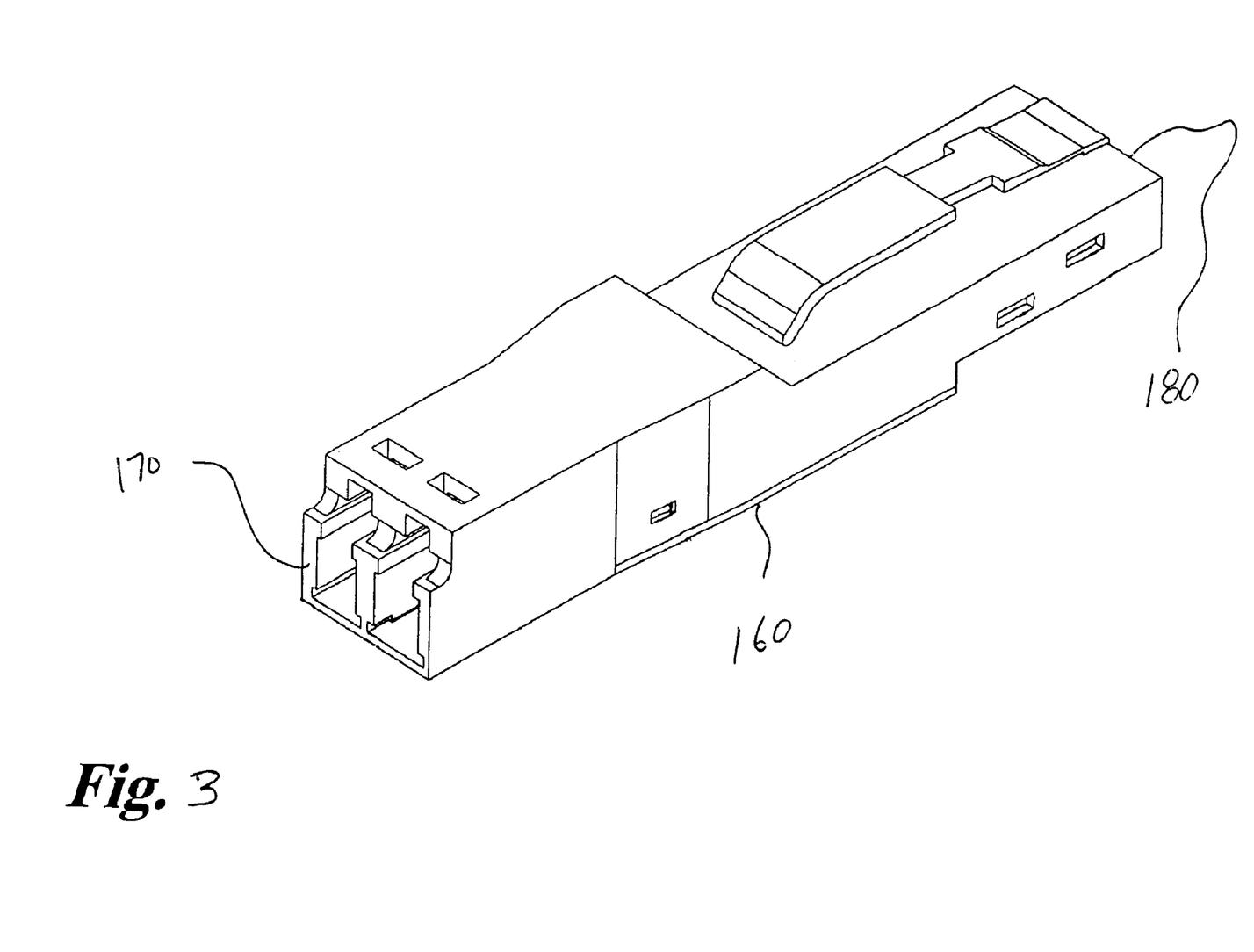
FIG. 3 is a perspective view of an optoelectronic transceiver which has an optical connector end and an electrical connector end.

Connectors and panels or patch panels are also known in the art. Known connectors include fiber optic connectors and electrically conductive connectors. An electrically conductive connector can be attached to electrically conductive cable such as copper based cable, or the electrical conductive connector can be integrated into a device such as an optoelectronic device. U.S. Pat. No. 6,350,063 discloses electrical connectors and cables, and an optoelectronic device. U.S. Pat. No. 6,350,063 is hereby incorporated herein by reference. FIG. 1 is a perspective view of an electrical connector 120 attached to an electrically conductive cable 122. Also shown is a complementary receptacle 130 into which the electrical connector 120 mates. FIG. 2 is a perspective view of another version of an electrical connector 140. The connector 140 is shown from a first perspective and a second perspective. FIG. 2 also discloses another version of a complementary receptacle 150. FIG. 3 is a perspective view of an optoelectronic device 160 which includes a fiber optic connector 170 and an electrical connector 180. The background material provided below concentrates on fiber optic connectors.

Figures 4, 5:
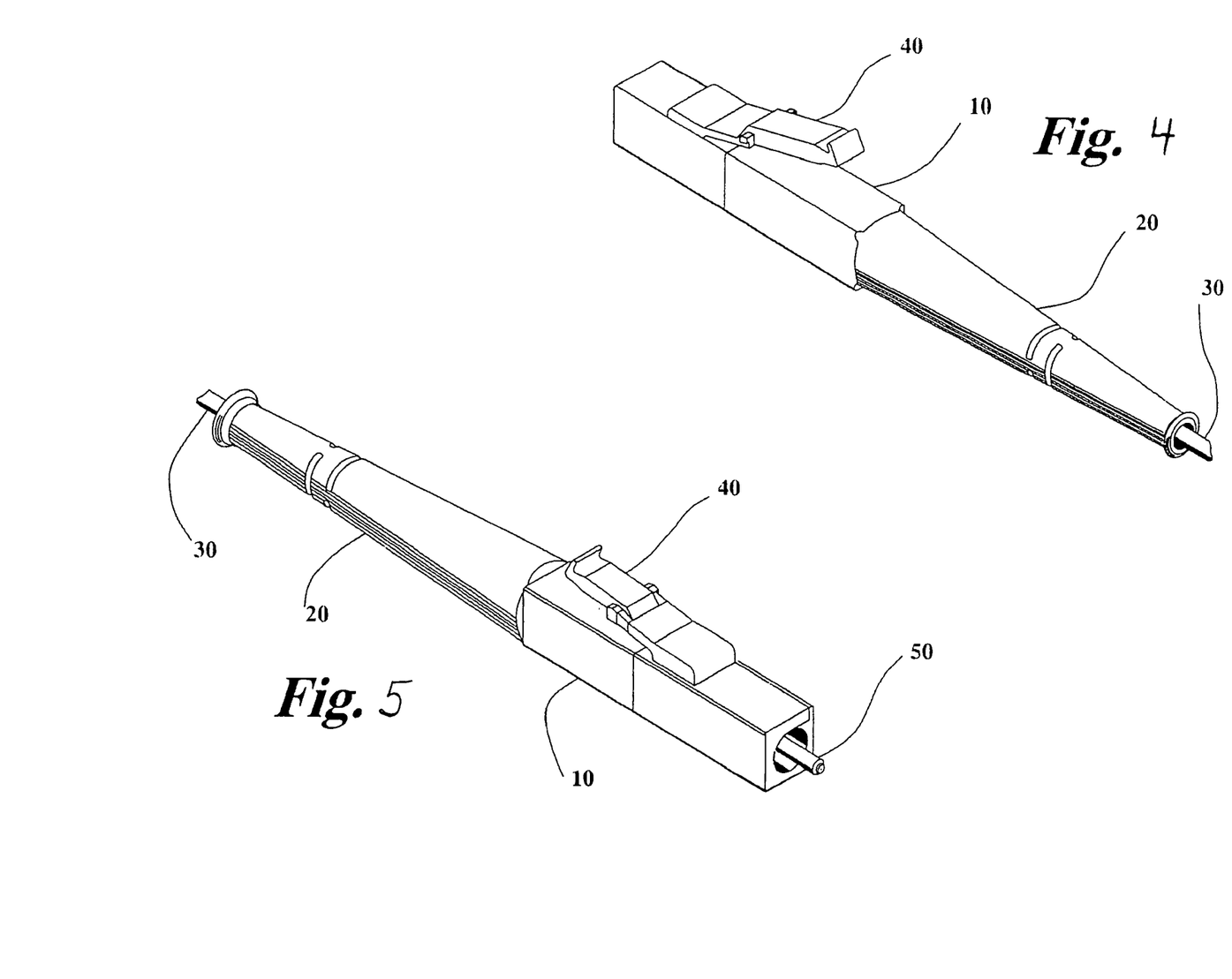
FIG. 4 is a perspective view of a known fiber optic cable and connector assembly.
FIG. 5 is a perspective view of the fiber optic cable and connector assembly of FIG. 4 taken from another angle.

The front panel of a host device has many receptacles. Each receptacle accepts at least an individual fiber optic cable. The other end of the fiber optic cable connects to another device. The fiber optic cable can have a length of a few meters or of a few kilometers. A host device can accommodate a few hundred fiber optic cables. U.S. Pat. Nos. 5,233,674, and 5,481,634 disclose a fiber optic cable having a fiber optic connector. U.S. Pat. Nos. 5,233,674, and 5,481,634 are hereby incorporated herein by reference. FIG. 4 is a perspective view of a fiber optic cable 30 having a fiber optic connector 10. Attached to the fiber optic connector 10 is a strain relief boot 20. Formed as part of the optic connector is a release lever 40. FIG. 5 is a perspective view of the fiber optic cable 30 of FIG. 4 taken from another angle where a ferrule 50 is exposed. The fiber optic connector 10 conforms to the LC style of fiber optic connectors.

Experience has shown that a fiber optic cable can be inadvertently detached from the host device, or that the optical fiber within the fiber optic cable breaks and the fiber optic cable no longer transmits light energy to the host device. In such instances, a worker must go and look at the panel of the host device and determine which cable is no longer transmitting light signals to the host device either because the optical fiber is broken or the fiber optic cable is detached from the host device. When two or more fiber optic cables are malfunctioning, the worker's job becomes very burdensome and time consuming since there are hundreds of fiber optic cables to examine. Furthermore, a device or person is not receiving information conveyed by the malfunctioning fiber optic cable. Thus, organization of the cables, including the fiber optic cables and the copper based cables, in the vicinity of the panel is of great interest to the operators of the host devices.

SUMMARY OF THE INVENTION

It is an object of the invention to provide a device which facilitates the identification of a specific connector or cable relative to a specific location on a panel.

In one form of the invention the device includes a fiber optic cable, a transponder, a substrate, an antenna, adhesive materials, and a transceiver. The transponder is attached to a fiber optic connector of the fiber optic cable via an adhesive material interposed between, and contacting both, the transponder and the fiber optic connector. The antenna is attached to the substrate via another adhesive material interposed between, and contacting both, the antenna and the substrate. The antenna includes a portion having a shape of a spiraling square, and the antenna is constructed of a copper material. The substrate is adapted for attachment to a panel of a host device, and the substrate is constructed of a polymer material. The transceiver is electrically connected to the antenna attached to the substrate so as to form a reader. The transponder includes a transponder antenna and an integrated circuit chip. In operation, when the transponder antenna is placed close enough to the antenna attached to the substrate, the transceiver is able to activate the transponder thus enabling the transceiver to read the information deposited with the transponder. Additionally, the fiber optic connector conforms to the LC standard. Information deposited with the transponder can include information related to the length of the fiber optic cable, information related to the industrial standard to which the fiber optic connector conforms, information related to the predetermined optical fiber grade of the optical fiber of the fiber optic cable, information related to the specific purchase date of the fiber optic cable, or information related to the warranty of the fiber optic cable.

In another form of the invention, the device includes a cable, a transponder, a substrate, an antenna, and a transceiver. The transponder is attached to the cable. The antenna is attached to the substrate. The substrate is adapted for attachment to a panel of a host device. The transceiver is electrically connected to the antenna so as to form a reader or interrogator. The cable can be a fiber optic cable or cable based on an electrically conductive material such as copper.

In still yet another form of the invention, the device includes a cable, a transponder, a substrate, an antenna, and a transceiver. The cable includes a connector. The transponder is attached to the connector. The antenna is attached to the substrate. The substrate is adapted for attachment to a panel of a host device. The transceiver is electrically connected to the antenna so as to form a reader or interrogator which is capable of activating and interrogating the transponder when the transponder is sufficiently close to the antenna. The cable can be a fiber optic cable or a cable based on an electrically conductive material such as copper. Likewise, the connector is a fiber optic connector when a fiber optic cable is used, and the connector is an electrically conductive connector when an electrically conductive cable is used.

In yet still another form of the invention the device includes an optoelectronic device, a transponder, a panel, an antenna, and a transceiver. The optoelectronic device includes a connector which conveys energy along electrically conductive materials housed within the connector. The transponder is attached to the optoelectronic device. The antenna is positioned adjacent to the panel. The transceiver is electrically connected to the antenna. In operation, when the transponder is placed close enough to the antenna, the transceiver is able to activate the transponder thus enabling the transponder to read the information deposited with the transponder.

Thus, the invention achieves the objectives set forth above. The invention provides a device which is able to determine the association between a specific location on a panel and a specific connector or cable whether it be fiber optic or electrically conductive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Referring now to the drawings, wherein like reference numerals designate identical or corresponding parts throughout the several views, and more particularly to FIGS. 6-15 thereof, embodiments of the present invention are displayed therein.

Figures 6, 7:
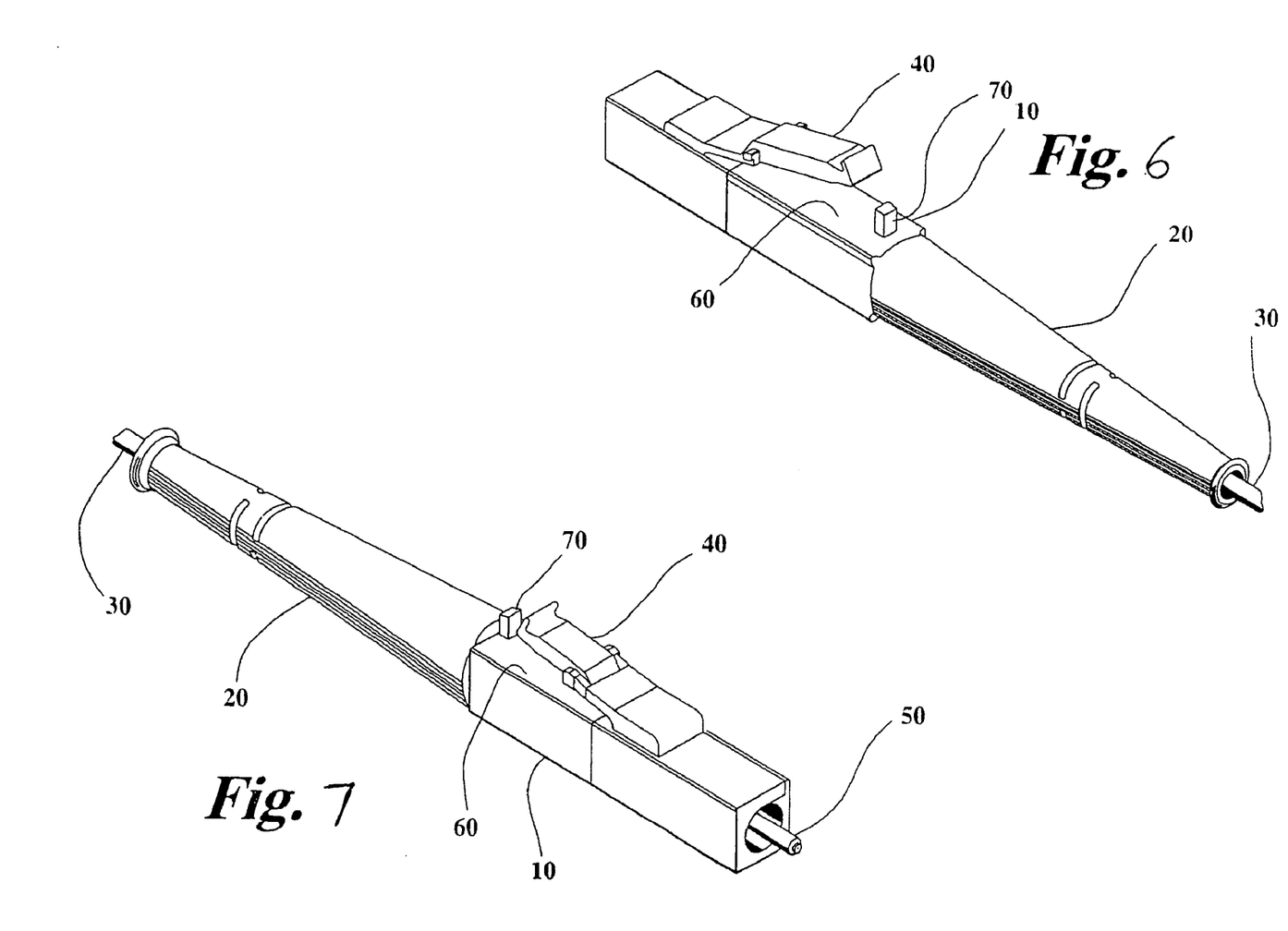
FIG. 6 is a perspective view of the combination of the fiber optic cable and the transponder.
FIG. 7 is a perspective view of the combination of the fiber optic cable and the transponder of FIG. 6 taken from another angle.

FIG. 6 is a perspective view of a fiber optic cable 30 having a fiber optic connector 10. The fiber optic connector 10 includes a release lever 40. Attached to the fiber optic connector 10 is a strain relief boot 20. Also attached to, or mounted on or in, the fiber optic connector 10 is a transponder 70. The transponder 70 can be affixed to the fiber optic connector 10 with an adhesive material or a clip (not shown). The clip physically squeezes or clamps the transponder 70 to the fiber optic connector 10. Alternatively, the transponder 70 can be insert molded into the body of the fiber optic connector 10. Furthermore, the transponder 70 can be attached to fiber optic connectors which are already in-service.

FIG. 7 is a perspective view of a fiber optic cable 30 of FIG. 6 taken from another angle. The view of the fiber optic cable 30 of FIG. 7 exposes the ferrule 50. The fiber optic connector 10 generally conforms to the LC standard, however, the fiber optic connector can also be constructed to conform to any other standard such as SC, and ST. The ferrule 50 is a single fiber ferrule, however multi-fiber ferrules and connectors can also be employed. Additionally, the fiber optic connector can be of its own unique design. Furthermore, the optical fiber terminated at the ferrule 50 can be any one of a single mode fiber, a multimode fiber, a polarization maintaining fiber, or any other type of optical fiber.

Figure 8:
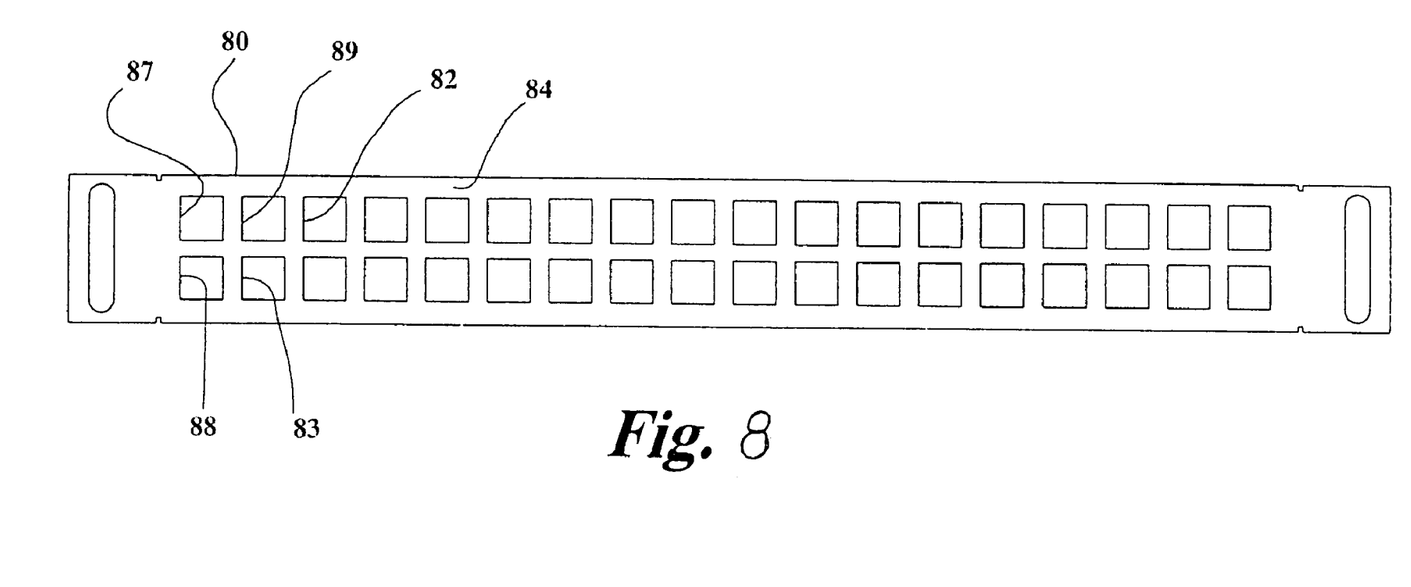
FIG. 8 is a front view of a panel of a patch panel or of a host device.
Figure 9:
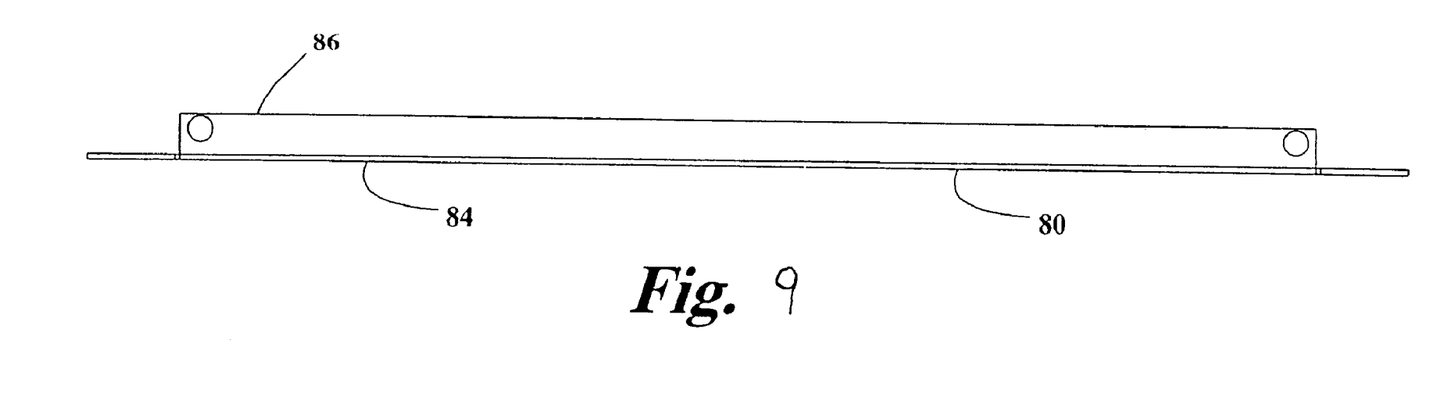
FIG. 9 is a side view of the panel of FIG. 8.

FIG. 8 is a front view of a panel 80. The panel 80 can belong to a patch panel device, a host device, or some other similar structure. The panel 80 has a front surface or face 84. The panel 80 includes many apertures 82, 83, 87, 88, and 89. FIG. 9 is a side view of the panel 80 which exposes the rear edge 86. By way of example, the aperture 82 allows the fiber optic connector 10 to pass beyond the front surface 84 of the panel 80 so as to gain access to the host device. The release latch 40 of the fiber optical connector 10 is used to secure the fiber optic connector 10 to the host device. Upon depressing the release lever 40 the fiber optic connector 10 can be removed from the hot device.

Figure 10:
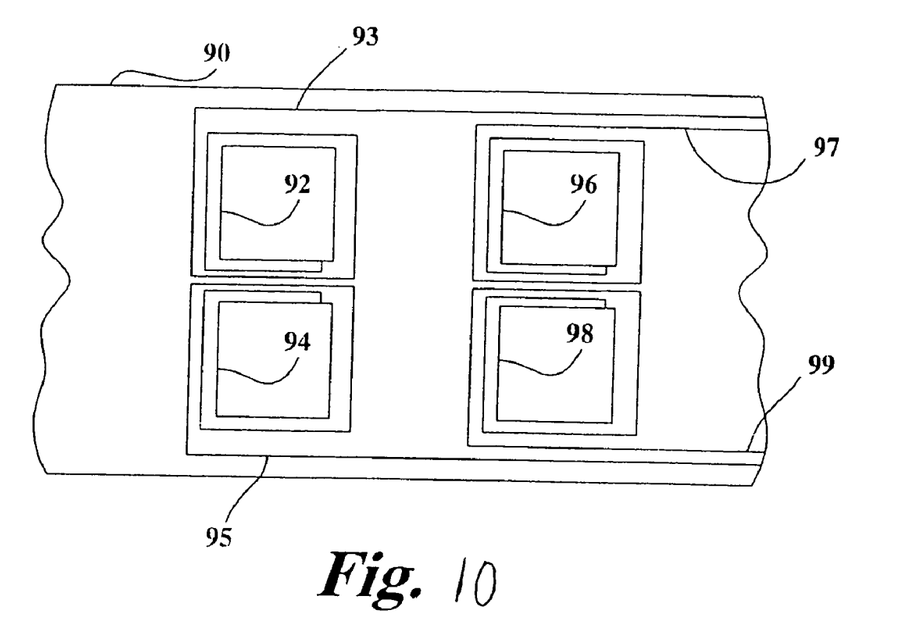
FIG. 10 is a partial front view of a substrate having apertures and coils or antennas.

FIG. 10 is a partial front view of a substrate 90 having apertures 92, 94, 96, 98, and coils or antennas 93, 95, 97, 99.

Each coil or antenna 93, 95, 97, 99 surrounds a respective aperture 92, 94, 96, 98. Each coil or antenna 93, 95, 97, 99 includes a portion having a shape of a spiraling square as is shown in FIG. 10. The coils or antennas 93, 95, 97, 99 are made of a suitable electrically conductive material such as copper. The coils or antennas 93, 95, 97, 99 are adhered or attached to a substrate or are sandwiched between two substrates. Typically, the coils or antennas 93, 95, 97, 99 are attached to the substrate with an adhesive material. The substrates are typically made of non-conductive or insulative materials such as mylar or other suitable polymer materials. Any number of apertures may be used. However, in this application the number of apertures 92, 94, 96, 98 of the substrate 90 should be of approximately the same size and have the same orientation and spacing as the apertures 87, 88, 89, 83 of the panel 80. U.S. Pat. No. 4,972,050 discloses a method of constructing a substrate, where the substrate includes conductive paths such as coils or antennas. U.S. Pat. No. 4,972,050 is hereby incorporated herein by reference. The antennas can be affixed originally to the panel 80, or in an alternative, as explained above, the antennas are part of the substrate 90 which can be mounted to a panel 80 of a host device which is already in-service.

Figure 11:
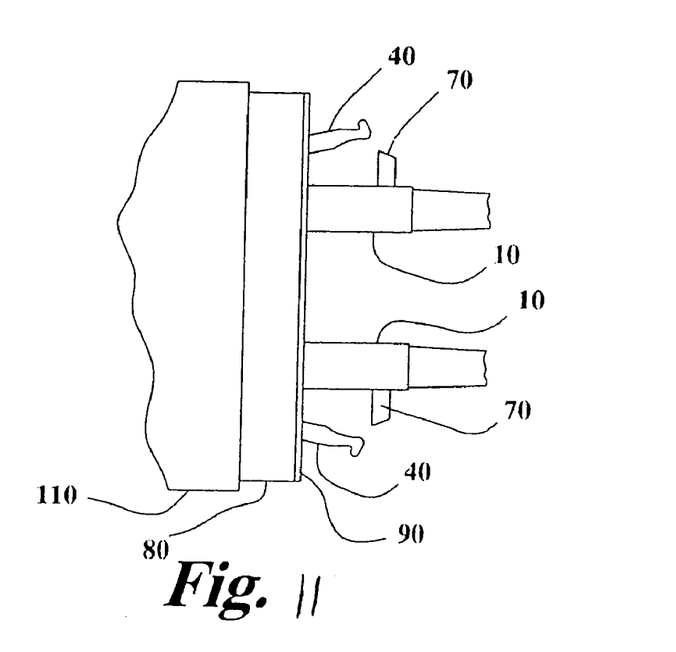
FIG. 11 is a partial side view of the combination of the fiber optic cable having the transponder of FIGS. 6 and 7 connected to the panel of FIGS. 8 and 9 of a host device where the panel includes the substrate of FIG. 10.

FIG. 11 is a partial side view of the substrate 90 being located adjacent to the front surface 84 of the panel 80 of the host device 110 where the fiber optic connector 10 is plugged into the host device 110. During assembly, the substrate 90 can be placed adjacent to the front surface 84 of the panel 80 by an adhesive material or clips or other methods of attachment well known in the art.

In practice, for example, a fiber optic connector 10 is inserted into and through aperture 92 of the substrate 90 and through aperture 87 of the panel 80 so as to engage the fiber optic connector 10 with the host device 110. Once installed, the antenna or coil 93 encircles a portion of the fiber optic connector 10 in the plane of the substrate 90. The transponder 70 is close enough to the antenna or coil 93 so that the radio waves, or electromagnetic power 104, emanating from antenna or coil 93 induce an electrical current in the transponder antenna 72 (see FIG. 12) of the transponder 70. The energy and frequency of the electrical signal running though the antenna or coil 93 is provided by a transceiver 102 (see FIG. 12) which is electrically connected to antennas or coils 93, 95, 97, and 99. The combination of an antenna and a transceiver is known as a reader or interrogator.

Figure 12:
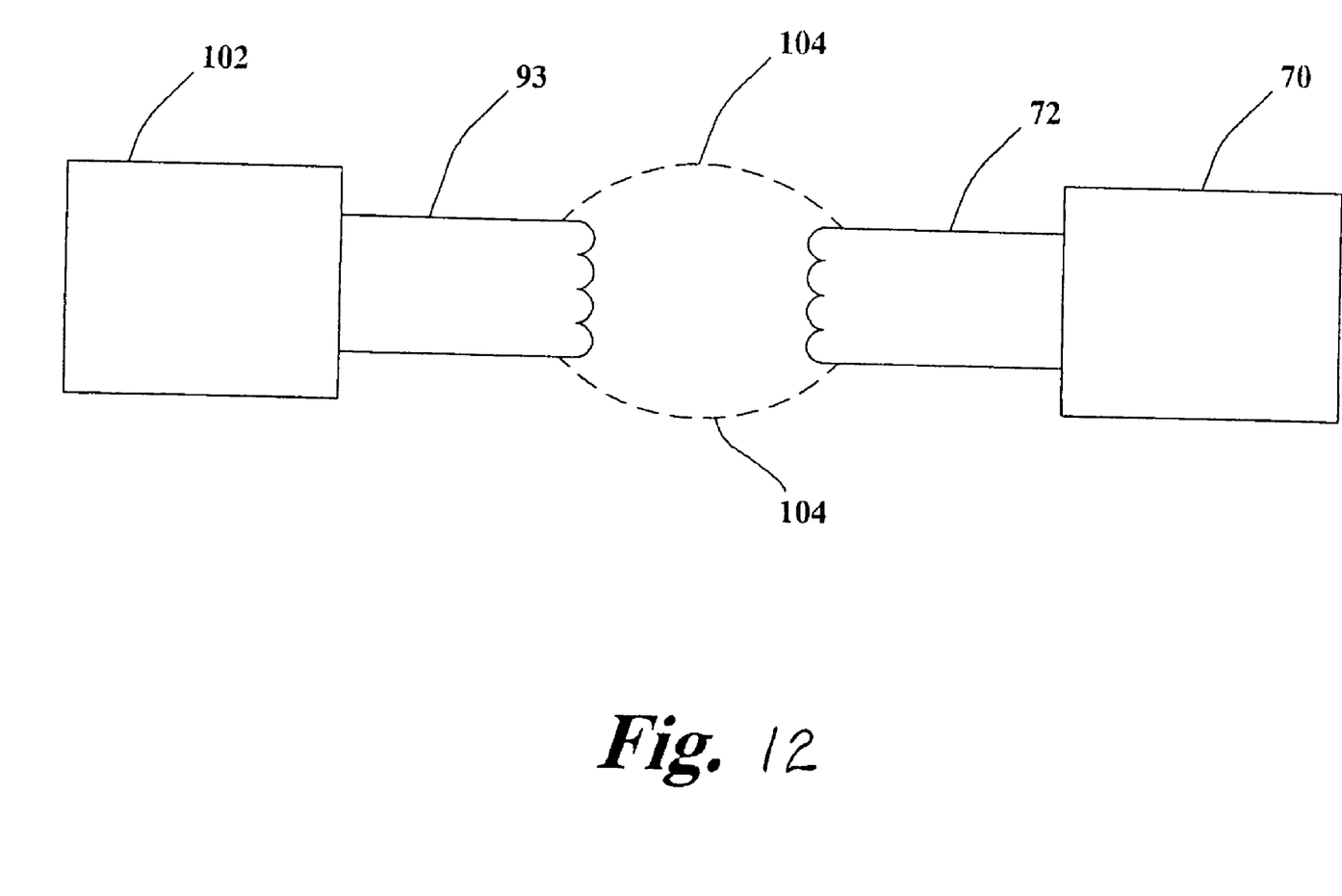
FIG. 12 is an electrical schematic of the electromagnetic interaction between the transponder and the reader or interrogator.

FIG. 12 is an electrical schematic of the electromagnetic interaction between the transponder 70 and the reader or interrogator (93, 102). Once the transponder 70 is energized by the power from the transceiver 102, the transponder sends information, which was previously stored on its integrated circuit chip, to the transceiver 102 via radio waves. The radio waves leave the transponder antenna 72 and are received by the antenna or coil 92. The induced electrical signal is then carried to the transceiver 102 for storage or manipulation of the data supplied by the transponder 70.

Examples of information which can be stored in the transponder 70 include the following information: the length of the fiber optic cable to which the transponder is attached; the date of purchase of the fiber optic cable to which the transponder is attached; the type or style of fiber optic connector to which the transponder is attached; the type of warranty associated with the fiber optic cable to which the transponder is attached; the type, style, or grade of optic fiber housed within the fiber optic cable to which the transponder; and/or a unique identification number or serialization number or code which uniquely identifies a specific fiber optic cable.

Thus, if the fiber optic cable goes dark because the optical fiber housed within the fiber optic cable is broken, then the host device 110, through the transceiver 102, can pinpoint the location of the malfunctioning fiber optic cable. The malfunctioning fiber optic cable can then be repaired or replaced. Additionally, the device provides a system operator with the ability to monitor the number and location of the fiber optic connectors attached to the host device.

Figure 13:
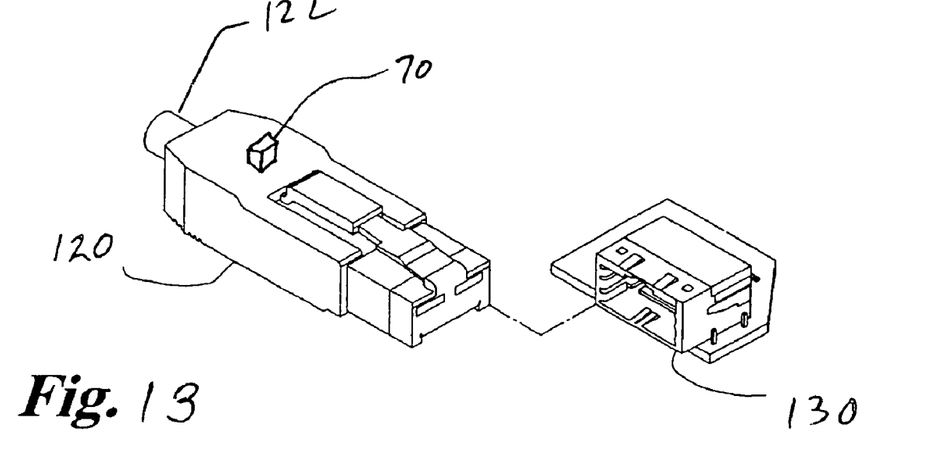
FIG. 13 is a perspective view of the combination of the electrically conductive, copper based cable of FIG. 1 and the transponder.
Figure 14:
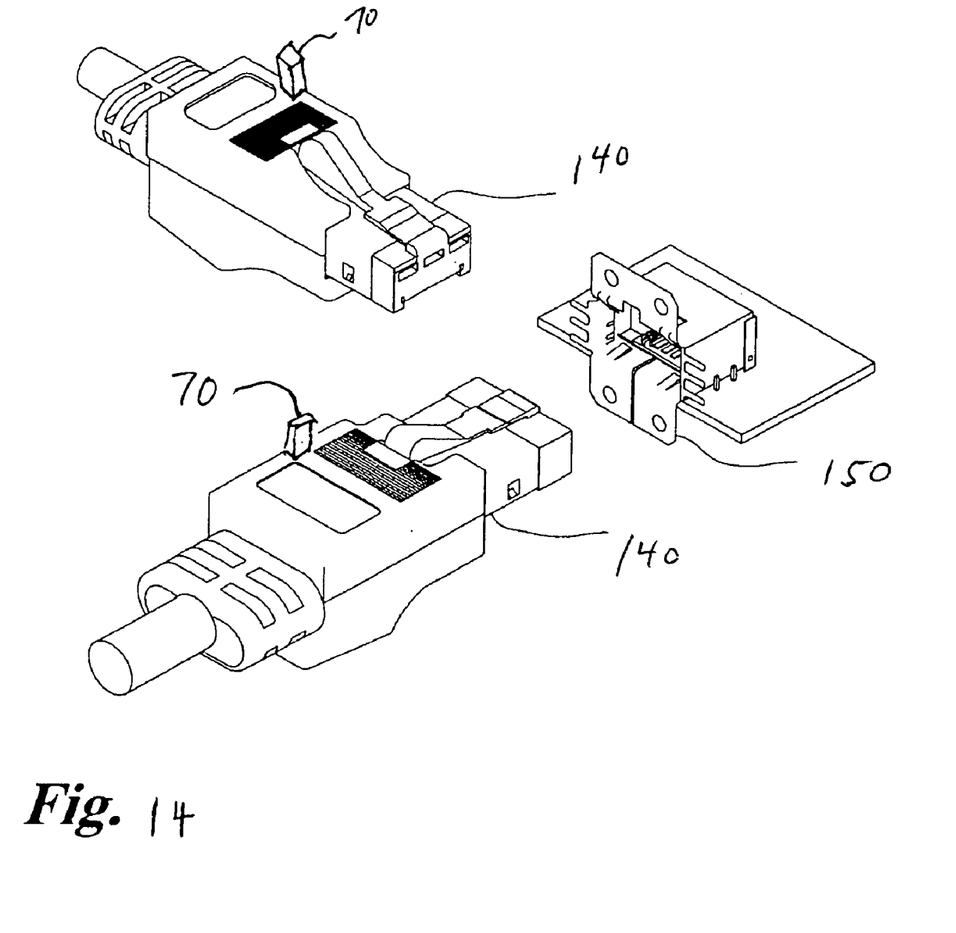
FIG. 14 is a perspective view of the combination of the electrically conductive, copper based cable of FIG. 2 and the transponder.

A second embodiment of the invention is disclosed in FIGS. 13 and 14. FIG. 13 is a perspective view of an electrical connector 120 to which is attached a transponder 70. The electrical connector 120 mates with a receptacle 130 which is mounted behind a panel (not shown). The panel and, if necessary, the associated substrate are constructed and operate as discussed above in regard to the first embodiment of the invention. Thus, when the electrical connector 120 which is associated with the electrical cable 122 is plugged into the host device, the antenna or coil associated with the host device will receive information from the transponder 70 mounted to the electrical connector 120. The transponder 70 can be attached to the electrical connector 120 by way of an adhesive material, a clip, or the transponder 70 can be insert molded into the body of the electrical connector 120. The transponder 70 can be attached to electrical connectors out in the field.

FIG. 14 is a perspective view of another version of the electric connector shown in FIG. 13. FIG. 14 provides two perspective views of electric connector 140 to which is attached transponder 70. Also shown is receptacle 150 which accepts electrical connector 140. Again, the panel of the host device is not shown for reasons of clarity. Note that the disclosed electrical connectors 120, 140 are used for illustration purposes only. The embodiment of the invention encompasses the attachment or mounting of a transponder to any type or style of electrical connector.

Figure 15:
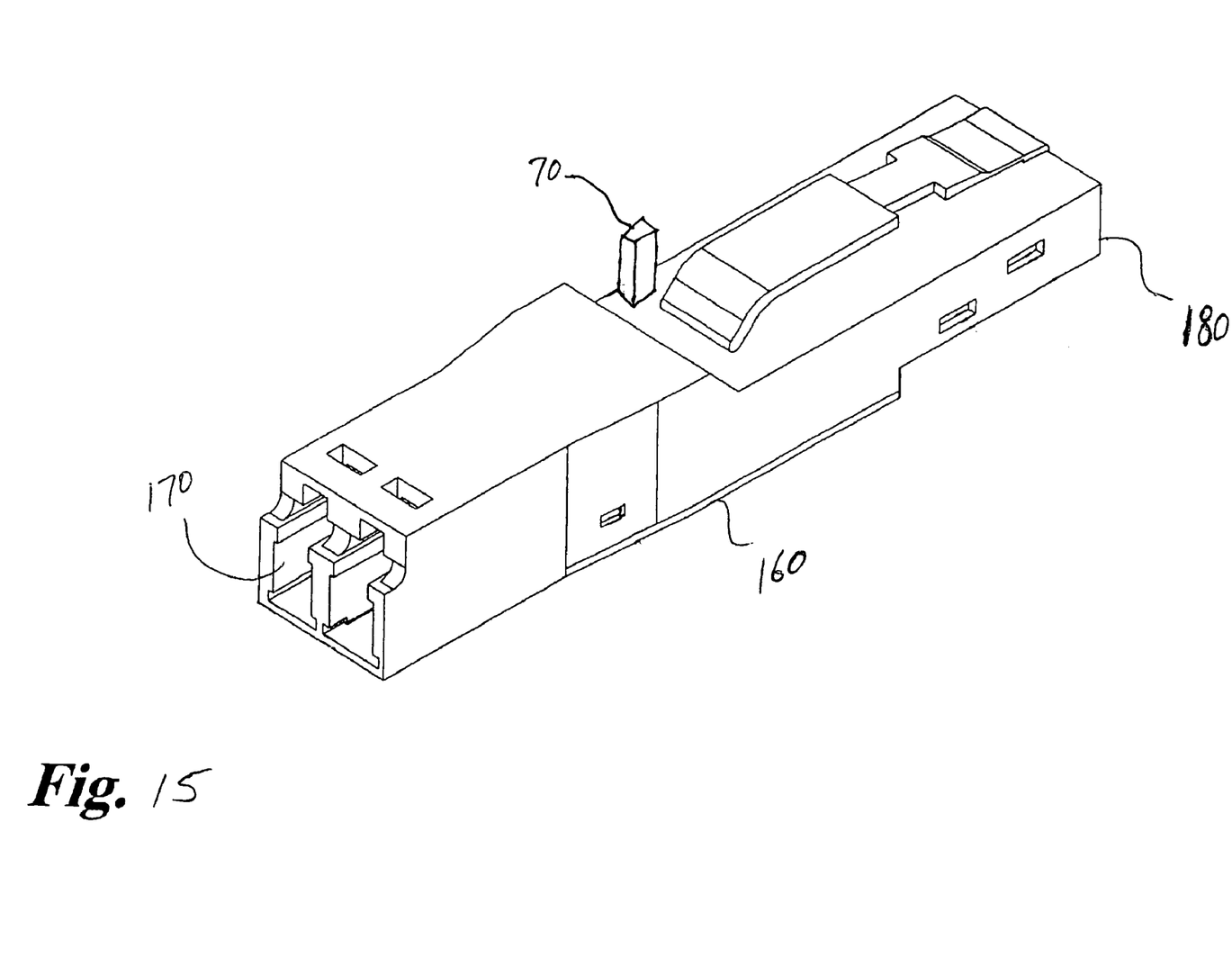
FIG. 15 is a perspective view of the combination of the optoelectronic device of FIG. 3 and the transponder.

A third embodiment of the invention is disclosed in FIG. 15. FIG. 15 is a perspective view of an optoelectronic device 160 to which is attached a transponder 70. The optoelectronic device 160 includes a fiber optic connector 170 and an electrical connector 180. In use, the optoelectronic device 160 has its electrical connector 180 attached to host device through a panel of the host device similar to the attachment of the optical fibers to the host device as discussed above in the explanation of the first embodiment of the invention. Thus, the antenna associated with the panel activates the transponder 70 of the optoelectronic device 160. The tranponder 70 can be attached to optoelectronic devices 160 which are in use, or the transponder 70 can be insert molded or mounted within the housing of the optoelectronic device 160. Note that the disclosed optoelectronic device 160 is used for illustration purposes only. The embodiment of the invention encompasses the attachment or mounting of a transponder to any type or style of optoelectronic device.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
   a fiber optic cable having a fiber optic connector, and wherein the fiber optic connector conforms to the LC standard;
   a transponder including a transponder antenna and an integrated circuit chip attached to the transponder antenna;

a first adhesive material interposed between, and contacting, both the transponder and the fiber optic connector so as to affix the transponder to the fiber optic connector;
a substrate adapted for attachment to a panel of a host device, the substrate constructed of a polymer material;
an antenna including a portion having a shape of a spiraling square, the antenna constructed of a copper material;
a second adhesive material interposed between, and contacting, both the antenna and the substrate so as to attach the antenna to the substrate; and
a transceiver electrically connected to the antenna attached to the substrate so as to form a reader which is capable of activating and interrogating the transponder when the transponder antenna is sufficiently close to the antenna attached to the substrate, and wherein
the fiber optic cable has a length, and wherein
the transponder includes information related to the length of the fiber optic cable.

2. A device comprising:
a fiber optic cable having a fiber optic connector;
a transponder including a transponder antenna and an integrated circuit chip attached to the transponder antenna;
a first adhesive material interposed between, and contacting, both the transponder and the fiber optic connector so as to affix the transponder to the fiber optic connector;
a substrate adapted for attachment to a panel of a host device, the substrate constructed of a polymer material;
an antenna including a portion having a shape of a spiraling square, the antenna constructed of a copper material;
a second adhesive material interposed between, and contacting, both the antenna and the substrate so as to attach the antenna to the substrate; and
a transceiver electrically connected to the antenna attached to the substrate so as to form a reader which is capable of activating and interrogating the transponder when the transponder antenna is sufficiently close to the antenna attached to the substrate, and wherein
the fiber optic connector conforms to an industrial standard known as the LC standard, and wherein
the transponder includes information related to the industrial standard.

3. A device comprising:
a fiber optic cable having a fiber optic connector, and wherein the fiber optic connector conforms to the LC standard;
a transponder including a transponder antenna and an integrated circuit chip attached to the transponder antenna;
a first adhesive material interposed between, and contacting, both the transponder and the fiber optic connector so as to affix the transponder to the fiber optic connector;
a substrate adapted for attachment to a panel of a host device, the substrate constructed of a polymer material;
an antenna including a portion having a shape of a spiraling square, the antenna constructed of a copper material;
a second adhesive material interposed between, and contacting, both the antenna and the substrate so as to attach the antenna to the substrate; and
a transceiver electrically connected to the antenna attached to the substrate so as to form a reader which is capable of activating and interrogating the transponder when the transponder antenna is sufficiently close to the antenna attached to the substrate, and wherein
the fiber optic cable includes an optical fiber, and wherein the optical fiber conforms to a predetermined optical fiber grade, and wherein
the transponder includes information related to the predetermined optical fiber grade of the optical fiber of the fiber optic cable.

4. A device comprising:
a fiber optic cable having a fiber optic connector, and wherein the fiber optic connector conforms to the LC standard;
a transponder including a transponder antenna and an integrated circuit chip attached to the transponder antenna;
a first adhesive material interposed between, and contacting, both the transponder and the fiber optic connector so as to affix the transponder to the fiber optic connector;
a substrate adapted for attachment to a panel of a host device, the substrate constructed of a polymer material;
an antenna including a portion having a shape of a spiraling square, the antenna constructed of a copper material;
a second adhesive material interposed between, and contacting, both the antenna and the substrate so as to attach the antenna to the substrate; and
a transceiver electrically connected to the antenna attached to the substrate so as to form a reader which is capable of activating and interrogating the transponder when the transponder antenna is sufficiently close to the antenna attached to the substrate, and wherein
the fiber optic cable was purchased on a specified date, and wherein
the transponder includes information related to the specific purchase date of the fiber optic cable.

5. A device comprising:
a fiber optic cable having a fiber optic connector, and wherein the fiber optic connector conforms to the LC standard;
a transponder including a transponder antenna and an integrated circuit chip attached to the transponder antenna;
a first adhesive material interposed between, and contacting, both the transponder and the fiber optic connector so as to affix the transponder to the fiber optic connector;
a substrate adapted for attachment to a panel of a host device, the substrate constructed of a polymer material;
an antenna including a portion having a shape of a spiraling square, the antenna constructed of a copper material;
a second adhesive material interposed between, and contacting, both the antenna and the substrate so as to attach the antenna to the substrate; and
a transceiver electrically connected to the antenna attached to the substrate so as to form a reader which is capable of activating and interrogating the transponder when the transponder antenna is sufficiently close to the antenna attached to the substrate, and wherein
the fiber optic cable was purchased pursuant to a warranty, and wherein
the transponder includes information related to the warranty.

* * * * *